United States Patent
Lefebvre et al.

(10) Patent No.: US 9,631,913 B2
(45) Date of Patent: Apr. 25, 2017

(54) CALIBRATION CONTROL DEVICE FOR METROLOGY TOOLS

(71) Applicant: Mitutoyo Corporation, Kawasaki-shi, Kanagawa-ken (JP)

(72) Inventors: Bruno Lefebvre, Conflans Sainte Honorine (FR); Michael Nahum, Kirkland, WA (US); Kim W. Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 342 days.

(21) Appl. No.: 14/014,331

(22) Filed: Aug. 29, 2013

(65) Prior Publication Data

US 2015/0059431 A1 Mar. 5, 2015

(51) Int. Cl.
*G01B 21/02* (2006.01)
*G01B 5/00* (2006.01)
(Continued)

(52) U.S. Cl.
CPC ........... *G01B 5/0002* (2013.01); *G01B 3/002* (2013.01); *G01B 3/18* (2013.01); *G01B 3/205* (2013.01);
(Continued)

(58) Field of Classification Search
CPC .. G01B 21/042; G01B 2210/58; G01B 3/002; G01B 3/18; G01B 3/205; G01B 5/0002
(Continued)

(56) References Cited

U.S. PATENT DOCUMENTS

| 5,008,665 A | 4/1991 | Wakatsuki |
| 5,574,381 A | 11/1996 | Andermo |

(Continued)

FOREIGN PATENT DOCUMENTS

| EP | 1579181 B1 | 1/2007 |
| EP | 2192706 A2 | 6/2010 |
| WO | 2006/067371 A1 | 6/2006 |

OTHER PUBLICATIONS

Albu, M.M., "Remote Calibration Using Mobile, Multiagent Technology," IEEE Transactions on Instrumentation and Measurement 54(1): 24-30, Feb. 2005.

(Continued)

*Primary Examiner* — Helen Kwok
*Assistant Examiner* — Nashmiya Fayyaz
(74) *Attorney, Agent, or Firm* — Christensen O'Connor Johnson Kindness PLLC

(57) ABSTRACT

A calibration control device for being coupled to a measuring device such as a caliper, micrometer, or gauge is provided. The calibration control device includes a circuit portion and couples to a coupling feature on the measuring device. A calibration limit portion defines a parameter limit as related to a usage limit for which the measuring device is certified as calibrated. A controller operates a host-side data connection portion of the calibration control device to output measuring data in a first mode when the usage limit is not exceeded, and operates the calibration control device to perform a calibration limit function when the usage limit is exceeded. The calibration limit function may include stopping the output of the measuring data through the host-side data connection or providing an out-of-calibration warning to the host, or the like.

24 Claims, 5 Drawing Sheets

(51) Int. Cl.
*G01B 3/00* (2006.01)
*G01B 21/04* (2006.01)
*G01B 3/18* (2006.01)
*G01B 3/20* (2006.01)

(52) U.S. Cl.
CPC ........ *G01B 21/042* (2013.01); *G01B 2210/58* (2013.01)

(58) Field of Classification Search
USPC .................................................. 73/1.79, 1.81
See application file for complete search history.

(56) References Cited

U.S. PATENT DOCUMENTS

| | | |
|---|---|---|
| 5,973,494 A | 10/1999 | Masreliez |
| 6,246,677 B1 | 6/2001 | Nap |
| RE37,490 E | 1/2002 | Andermo |
| 6,337,836 B1 | 1/2002 | Eidelson |
| 6,515,484 B1 | 2/2003 | Bald |
| 6,605,471 B1 * | 8/2003 | Lundsgaard ....... G01N 33/4925 422/430 |
| 6,671,976 B2 | 1/2004 | Takahashi |
| 6,753,686 B2 | 6/2004 | Tsuboi |
| 6,764,343 B2 | 7/2004 | Ferentz |
| 7,079,019 B1 | 7/2006 | Ruggiero |
| 7,398,164 B2 | 7/2008 | Ogushi |
| 7,400,415 B2 | 7/2008 | Patzwald |
| 8,131,896 B2 | 3/2012 | Yamagata |
| 2006/0162178 A1 | 7/2006 | Freidin |
| 2009/0307392 A1 | 12/2009 | Mychalowych |
| 2010/0083730 A1 * | 4/2010 | Le .......................... G01K 3/005 73/1.02 |
| 2010/0280872 A1 | 11/2010 | Scholte-Wassink |
| 2012/0185195 A1 * | 7/2012 | Sugiyama ........ G01N 35/00732 702/85 |
| 2012/0203504 A1 * | 8/2012 | Jordil ..................... G01B 3/205 702/162 |
| 2012/0310397 A1 | 12/2012 | Rataul |
| 2012/0326844 A1 | 12/2012 | Blaignan |
| 2013/0004127 A1 | 1/2013 | McColloch |
| 2014/0251836 A1 * | 9/2014 | Feeney .................. G01N 27/27 205/792 |

OTHER PUBLICATIONS

"DM5E Series Wall Thickness Gage," Bently Nevada, 1 page.
"Orbit® 3 Digital Gauging and Positioning Network," Solartron Metrology, http://www.solartronmetrology.com/products/orbit3/index.aspx [retrieved Apr. 7, 2014], 2 pages.

* cited by examiner

CALIBRATION CONTROL DEVICE FOR METROLOGY TOOLS

FIELD

The present disclosure relates generally to precision measurement instruments, and more particularly to systems and methods for tracking a limited period for which an electronic measuring device such as a caliper, micrometer, or gauge has been certified as being calibrated.

BACKGROUND

Various electronic measuring devices, such as calipers, micrometers, or gauges, are known that use electronic position encoders. These encoders are generally based on low-power inductive, capacitive, or magnetic position-sensing technology. In general, an encoder may comprise a readhead and a scale. The readhead may generally comprise a readhead sensor and readhead electronics. The readhead outputs signals that vary as a function of the position of the readhead sensor relative to the scale, along a measuring axis. In a measuring device such as an electronic caliper, the scale is generally affixed to an elongated scale member that includes a first measuring jaw and the readhead is affixed to a slider that is movable along the scale member and that includes a second measuring jaw. Thus, measurements of the distance between the two measuring jaws may be determined based on the signals from the readhead. Exemplary electronic calipers are disclosed in commonly assigned U.S. Pat. Nos. RE37490; 5,574,381; 5,973,494; 6,671,976; and 8,131,896, each of which is hereby incorporated by reference in its entirety.

Such electronic metrology tool devices may perform high-precision measurement operations, and calibration and/or certification operations may be performed on the devices to ensure the accuracy of the measurements. Once a device is calibrated, the calibration may be certified as being valid for a limited period of time or usage. For example, for a given calibration of a device, a due date may be determined when the calibration will expire and when recalibration will be required. In accordance with certain calibration standards, it may be desirable to limit the use of the device once the calibration has expired and until recalibration has been performed.

As one example, calibration may comprise checking the measurements provided by a device under specified test conditions (e.g., within a specified temperature range) against a standard or reference object that has a certified characteristic that is traceable back to a standard such as a length or dimension standard maintained at national laboratory, or a comparison or transfer standard established at a factory, or the like. If the measurements are within the specified accuracy of the device in comparison to the known characteristic of the standard, then the device may be considered "calibrated," and may be certified as calibrated. Calibration need not necessarily comprise adjusting a device mechanically or electronically, or changing an internal scale factor or lookup table, or the like, although it may include such operations if they are needed to make the device perform within the specified accuracy.

One known technique for keeping track of calibration expiration dates is to put the relevant calibration information on a label that is attached to the device. U.S. Pat. No. 6,337,836 discloses a programmable electronic label that can be attached to a device and can track a calibration due date and provide an alert message when recalibration is required. However, a user may not see or may choose to ignore the label and continue to use the device for functions such as providing measurement data to a host device after the calibration has expired. Certain more complex devices may have the capacity to be programmed internally with calibration information; however, simpler devices such as already existing electronic calipers, micrometers, or gauges may lack the ability to be programmed in such a manner. A need exists for a system and method to track a limited calibration period for an existing measuring device such as an electronic caliper or micrometer or gauge, and to take action for inhibiting or altering the output of the device once the calibration period has expired.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A calibration control device for being coupled to a measuring device is provided. In various implementations, the calibration control device includes a circuit portion and a body portion configured to couple to a coupling feature on the measuring device. The circuit portion includes an identifier portion, device-side and host-side data connection portions, a calibration limit portion, a comparison portion, and a controller portion. The identifier portion is configured for electronically identifying at least one of the calibration control device and the attached measuring device.

The device-side data connection portion couples to the measuring device for receiving measuring data from the measuring device. The host-side data connection portion couples to a host device and outputs measuring data to the host device. The calibration limit portion is used to define a parameter limit as related to a limited period for which the measuring device has been certified as being calibrated. The parameter limit is defined in terms of a parameter that is related to at least one of time or usage of the measuring device. The comparison portion compares the current state of the parameter to the parameter limit.

The controller portion provides control signals to operate the calibration control device, wherein: the controller portion operates the calibration control device to output the measuring data to the host device in a first mode through the host-side data connection portion when the parameter does not exceed the parameter limit; and the controller portion operates the calibration control device to perform a calibration limit function when the parameter exceeds the parameter limit, the calibration limit function being indicative that the parameter exceeds the parameter limit.

In some embodiments, the calibration limit function may comprise at least one of (a) operating the host-side data connection to output an indicator that the parameter has exceeded the parameter limit, (b) stopping the output of the measuring data through the host-side data connection to the host device, and (c) operating the host-side data connection to output the measuring data to a host device in a second mode that is different than the first mode such that it is indicative of the parameter exceeding the parameter limit (e.g., a warning mode that outputs a warning regarding calibration certification expiration, with or without measuring data). In various implementations, the circuit portion may also include a clock/event counter portion that indicates the current state of the parameter to the comparison portion.

The circuit portion may also include a data control switch portion that is connected to receive signals from the device-side data connection portion and further configured to output measuring data to the host-side data connection portion when the data control switch portion is in a first state (e.g., a transmitting state) corresponding to the parameter not exceeding the parameter limit, and to perform at least a portion of the calibration limit function when the communication switch portion is a second state corresponding to the parameter exceeding the parameter limit. In one implementation, the calibration limit function that is performed when the parameter has exceeded the parameter limit (which may indicate that the calibration for the measuring device has expired) includes altering the state of the data control switch portion to place the data control switch portion in one of a blocking state or a warning state (e.g., as controlled by a calibration limit control signal). The warning state may include providing an out-of-calibration warning signal with any measuring data that is transmitted. Such an out-of-calibration warning signal may also be provided by the controller portion or other components of the circuit portion independently of the data control switch portion.

In various implementations, the identifier portion may be utilized to identify the calibration control device and/or the attached measuring device to a host system, and/or to ensure that the calibration control device is not removed from the measuring device or otherwise attached to another measuring device. In one implementation, a trigger circuit or function may be included in the circuit portion that operates in conjunction with the identifier portion to alter operations of the calibration control device or otherwise provide a warning if the calibration control device is removed from the measuring device. For example, the trigger circuit or function may be configured to receive an identification signal from the measuring device and to conform the identification indicated by the identifier portion to the identification that is indicated by the identification signal from the measuring device. If the identification that is indicated by the identification signal from the measuring device does not match the identification indicated by the identifier portion, the controller portion may prevent measuring data from being sent to the host device and may provide a signal indicating that the measuring device identification does not match.

In various implementations, at least one of the circuit portion and the host-side data connection may include a wireless communication portion. The wireless communication portion may be configured to receive programming signals for programming the calibration control device. The wireless communication portion may also be configured to wirelessly transmit a device identification as indicated by the identifier portion and an indication of whether the parameter has reached the parameter limit as indicated by the calibration limit portion. The wireless communication portion may also be configured to wirelessly transmit measurement data.

In various implementations, an indicator component may be included on the calibration control device and may be utilized to implement at least part of the calibration limit function as controlled by the controller portion. In one implementation, the indicator component provides an indication when the parameter reaches the parameter limit. The indicator component may also or alternatively provide an early warning indication before the parameter reaches the parameter limit. In various implementations, the indicator component may consist of a physical indicator that may be located on the surface of the calibration control device and may utilize relatively little power (e.g., an LCD, OLED, etc.).

In one implementation, the host-side data connection portion may include a power connection for receiving power from the host device for powering the calibration control device. In an alternative implementation, the device-side data connection portion may include a power connection for receiving power from the measuring device for powering the calibration control device. In yet another implementation, the calibration control device may include a battery for powering the calibration control device. An implementation with a battery or a power connection to the measuring device may be desirable if the calibration control device transmits data wirelessly such that there is not a physical connection to the host device for providing power.

In various implementations, the body portion may comprise an interlocking portion that physically interlocks the calibration control device to the measuring device such that it cannot be removed without a specialized interlock release tool. A mechanical trigger component may be included that operates in conjunction with the interlocking portion to alter operations of the calibration control device or otherwise provide a warning if the calibration control device is removed from the measuring device. In one implementation, the body portion may be shaped to fit within a recessed portion of the measuring device such that the calibration control device does not significantly protrude from the surface of the measuring device when the calibration control device is inserted in the recessed portion and attached to the measuring device.

In some implementations, a host connection may not be useful or required, and a calibration control device may be configured to take advantage of communication and/or control possibilities through the device-side connection portion to control or otherwise disable the attached measuring device. In such embodiments, the calibration control device may comprise a body portion configured to couple to a coupling feature on the measuring device, and a circuit portion comprising: a device-side data connection portion for coupling to the measuring device for receiving measuring data from the measuring device; a calibration limit portion that defines a parameter limit as related to a limited period for which the measuring device has been certified as being calibrated, the parameter limit being defined in terms of a parameter that is related to at least one of time or usage of the measuring device; a comparison portion for comparing the current state of the parameter to the parameter limit; and a controller portion for providing control signals to operate the calibration control device, wherein: the controller portion operates the calibration control device to allow a measuring device display on the measuring device to display the measuring data in a first mode when the parameter does not exceed the parameter limit; and the controller portion operates the calibration control device to alter the measuring device display when the parameter exceeds the parameter limit, the display alteration being indicative that the parameter exceeds the parameter limit.

In some such embodiments, altering the measuring device display comprises at least one of (a) altering the appearance of the displayed measuring data, (b) stopping display of the measuring data, and (c) activating an indicator element that is indicative that the parameter exceeds the parameter limit. In one embodiment, stopping the display of the measuring data may comprise disabling or "locking up" the operation of the measuring device.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

DETAILED DESCRIPTION

Figure 1:
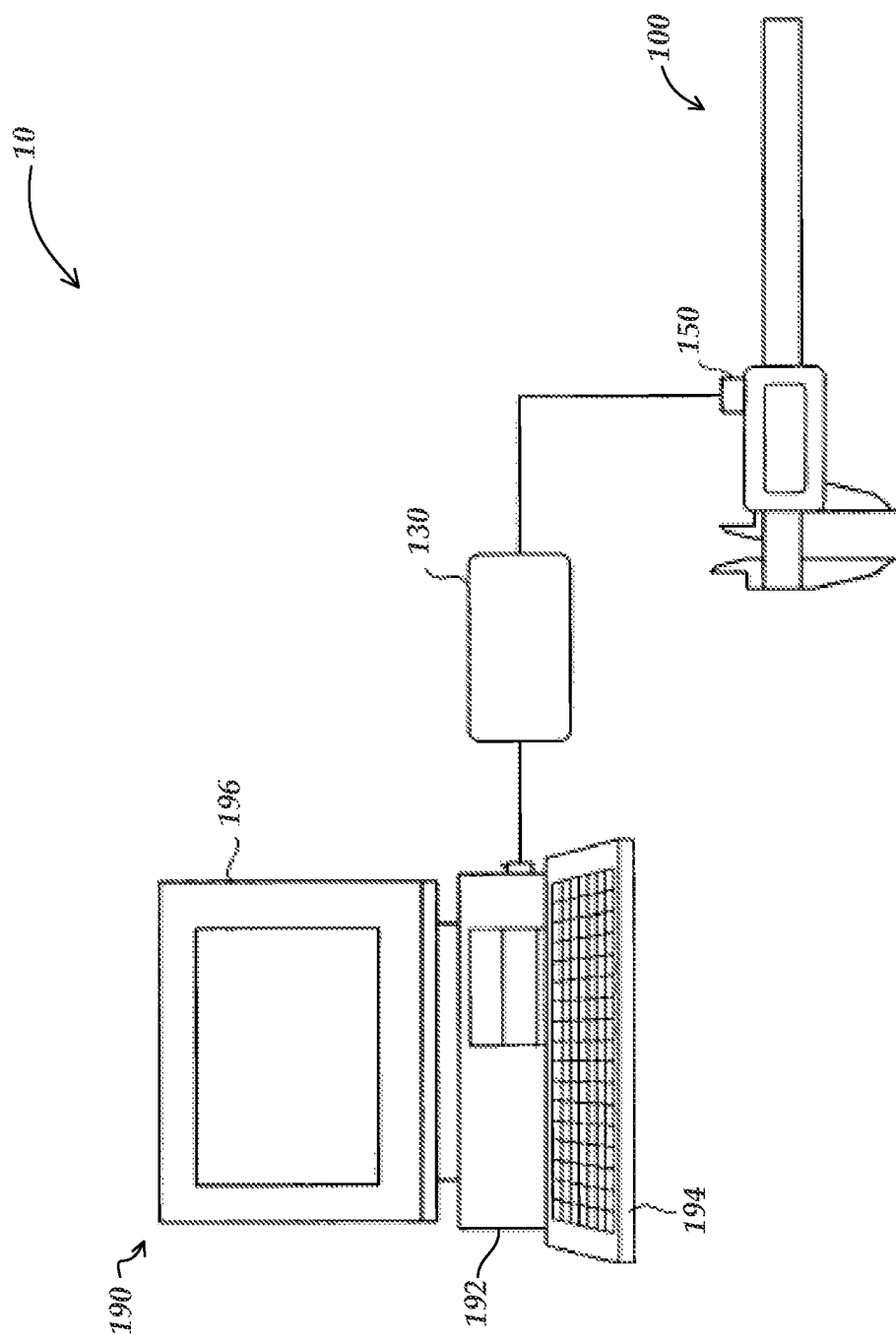
FIG. 1 is a block diagram of an exemplary measurement system including a calibration control device as coupled to a measuring device and as receiving a wired connection from a host device.

FIG. 1 is a block diagram of an exemplary measurement system 10 including a calibration control device 150 as coupled to a measuring device 100 and as receiving a wired connection 130 from a host device 190. As will be described in more detail below, the calibration control device 150 may be attached to the measuring device 100, and may keep track of a limited period for which the measuring device 100 has been certified as being calibrated. The calibration control device 150 may be coupled to a primary output port of the measuring device 100 for transmitting measuring signals from the measuring device 100 through the wired connection 130 to the host device 190.

During normal measurement operations, the host device 190 may receive measuring signals as output from the measuring device 100 through the calibration control device 150 and the wired connection 130. The measuring signals may be related to the measurements of a workpiece taken with the measuring device 100. The host device 190 may include a computer system 192 that is operably connected to a keyboard 194 and a monitor 196 and/or other input or output devices. The measurement data from the measuring device 100 may be displayed on the monitor 196. In one implementation, when the calibration for the measuring device 100 expires, the calibration control device 150 may prevent the output of measuring data from being transmitted to the host device 190. Alternatively, the calibration control device 150 may allow measuring data to be transmitted, but may include an out-of-calibration warning signal or feature with the measuring data.

Figure 2:
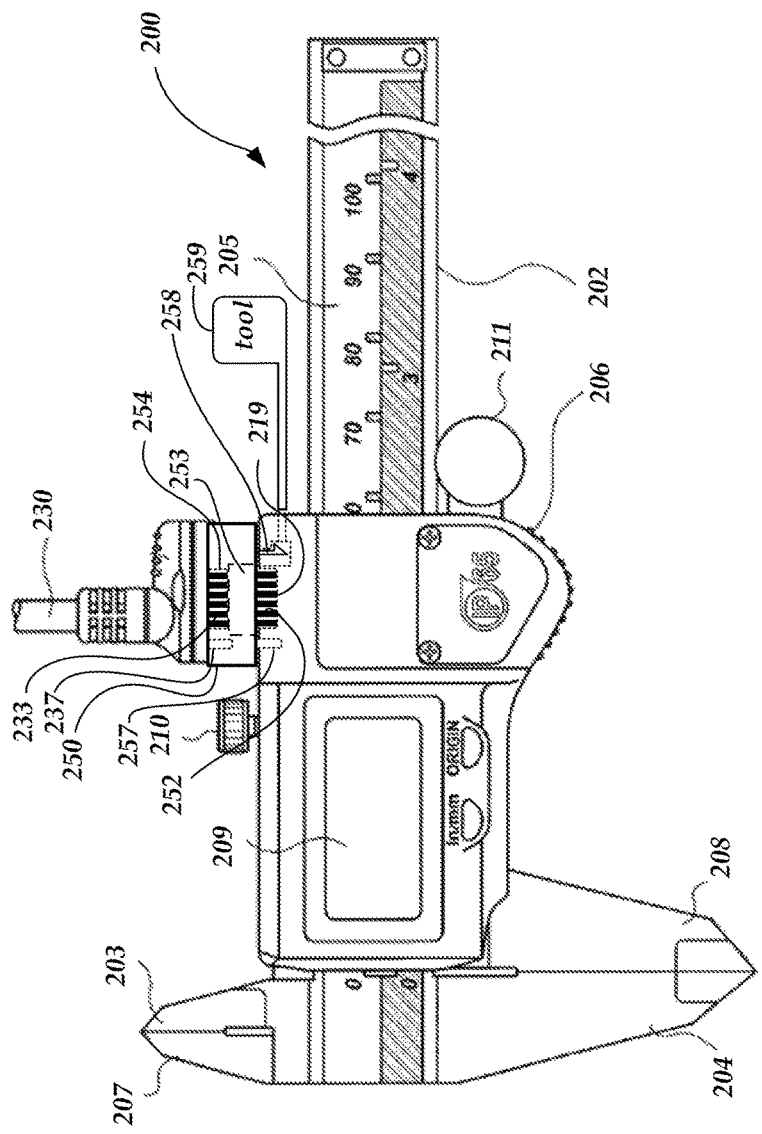
FIG. 2 is a diagram of a front elevation view of a calibration control device as coupled to a measuring device and as receiving a wired connection similar to that of FIG. 1.

FIG. 2 is a diagram of a front elevation view of a calibration control device 250 as coupled to a measuring device 200 and as receiving a wired connection 230 from a host device, similar to that of FIG. 1. In the embodiment of FIG. 2, the measuring device 200 is a caliper capable of outputting measurement data obtained from measurement of a workpiece. The measuring device 200 is described in more detail in commonly assigned U.S. Pat. No. 6,671,976 (the '976 patent), which is hereby incorporated by reference in its entirety.

As will be described in more detail below with respect to FIG. 3, the calibration control device 250 includes a device-side male connector 252 on a bottom portion and a host-side female connector 254 on a top portion. The host-side female connector 254 receives a male connector 233 from the wired connection cable 230. The device-side male connector 252 of the calibration control device 250 is received within a female connector 219 of the measuring device 200. The female connector 219 may be the primary output port of the measuring device 200 for providing measuring data to external devices (e.g., the host device 190 of FIG. 1). In one implementation, the female connector 219 may include a sealing type elastomeric interconnector 220 having alternating laminations of conductive portions 221 and nonconductive portions 222, as disclosed in the '976 patent, and the male connector 252 may be a complementary type of connector. However, more generally, any suitable connection method may be used, and the female connector 219 may be part of an RS-232 port, a serial port, an interface such as a digimatic interface compatible with a connector (e.g., a flat connector, a circular 6-pin connector, a flat 10-pin connector, etc.) or any other output port for providing measuring data to an external device. Certain types of output ports and connectors are described in more detail in commonly assigned U.S. Pat. No. 8,131,896, which is hereby incorporated by reference herein in its entirety.

Interlock fasteners 257 may be utilized to fixedly attach the calibration control device 250 to the measuring device 200. In various embodiments, in order to comply with various security requirements that may be associated with calibration and/or certification, the interlock fasteners 257 are formed such that the calibration control device 250 may not be removed from the measuring device 200 without utilizing a specialized tool. In one embodiment, an interlock portion 258 may be included that does not utilize separate fasteners, but that requires a specialized interlock release tool 259 to be utilized in order for the calibration control device 250 to be removed from the measuring device 200. As will be described in more detail below with respect to FIG. 5, the calibration control device 250 may also include a calibration control circuit 253 that enables the performance of various functions of the calibration control device 250.

The measuring device 200 has a main scale 202 having a longitudinal portion, and a slider 206 provided on the main scale 202 in a manner capable of slide movement along the longitudinal direction of the main scale 202. The main scale 202 has an inside measurement jaw 203 and an outside measurement jaw 204 respectively provided on the upper and lower periphery on the base end of the longitudinal portion and a scale 205 provided at an inner portion of the longitudinal portion along the longitudinal direction. The inside measurement jaw 203 and the outside measurement jaw 204 are respectively integrated to the main scale 202.

The outer surface of the slider 206 is provided with an inside measurement jaw 207 and an outside measurement jaw 208 respectively formed on the upper and lower periphery on the base end and a digital display 209 formed on the front surface thereof. Further, a clamp screw 210 for fixing the position of the slider 206 is screwed thereto. A feed roller 211 to be in contact with the longitudinal portion of the main scale 202 to move the slider 206 by rotation thereof is provided on the outer surface of the slider 206. The inside measurement jaw 203 and the outside measurement jaw 204 are integrated with the slider 206.

During measurement operations, the slider 206 is moved by the feed roller 211 so that the measurement jaw 207 or 208 is in contact with a target portion of a workpiece together with the measurement jaw 203 or 204. At this time, the displacement of the slider 206 is detected by the scale 205 provided on the longitudinal portion of the main scale 202 and the detection head of the slider 206. The detected measurement signal is processed as measurement data by a circuit board (not shown) to be displayed on the digital display 209 at the front side of the slider 206 and/or to be output to a host device.

Figure 3:
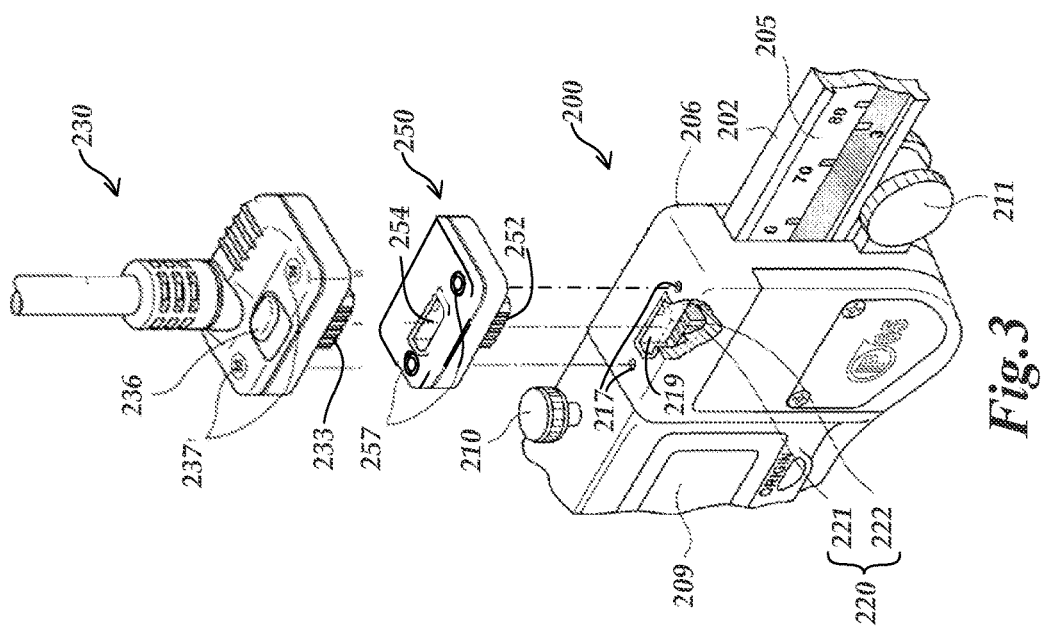
FIG. 3 is a diagram of a perspective view of the calibration control device and measuring device of FIG. 2.

FIG. 3 is a diagram of a perspective view of the calibration control device 250 of FIG. 2 as coupled to the measuring device 200. As shown in FIG. 3, the calibration control device 250 includes the device side male connector 252, host-side female connector 254, and interlock fasteners 257. The male connector 233 of the connector cable 230 is received within the host-side female connector 254. The connector cable 230 is secured to the calibration control device 250 with setscrews 237 that may be received within receiving holes of the interlock fasteners 257. The device-side male connector 252 is received within the female connector 219 of the measuring device 200. The measuring device 200 includes holes 217 for receiving the interlock fasteners 257 of the calibration control device 250. In various implementations, the interlock fasteners 257 may consist of permanent or semi-permanent fasteners. As described above with respect to FIG. 2, an interlock portion 258 may also be included that requires a specialized interlock release tool 259 for removal.

When the connector cable 230 is plugged into the calibration control device 250, and the other end of the connector cable 230 is connected to a host device (e.g., host device 190 of FIG. 1), measurement data that is output from the measuring device 200 may be transmitted to the host device. In one implementation, a manual data transmission switch 236 may be provided on a connecting portion of the connector cable 230 that enables the transmission of data through the connector cable 230. As will be described in more detail below, even when the data transmission switch 236 is pressed, if the calibration for the measuring device 200 has expired, a data control switch portion within the calibration control device 250 may inhibit or otherwise modify the transmission of the measurement data to the host device.

Figure 4:
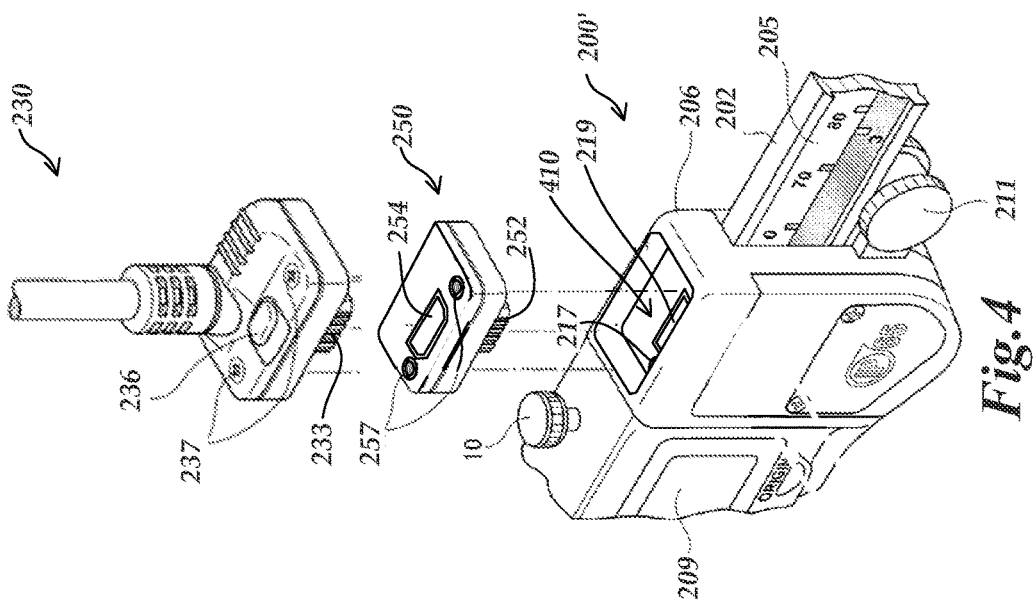
FIG. 4 is a diagram of a perspective view of a calibration control device and a measuring device with a recessed portion for receiving the calibration control device.

FIG. 4 is a diagram of a perspective view of the calibration control device 250 as coupled to a measuring device 200' with a recessed portion 410 for receiving the calibration control device 250. As shown in FIG. 4, the recessed portion 410 is generally shaped so as to correspond to the outer body dimensions of the calibration control device 250. The bottom of the recessed portion 410 includes the female connector 219 for receiving the device-side male connector 252 of the calibration control device 250. The recessed portion 410 also includes holes 217 for receiving the interlock fasteners 257.

In one implementation, the recessed portion 410 has dimensions such that when the calibration control device 250 is secured within the recessed portion 410 by the interlock fasteners 257, the body of the calibration control device 250 is relatively flush with and does not significantly protrude from the surface of the measuring device 200. When a new measuring device 200' includes such a recessed portion 410, then it is convenient that the calibration control device 250 may be fit to it as an integrated portion, without disturbing the ideal ergonomics of the measuring device 200'. Alternatively, the calibration control device 250 may be left off to reduce the cost, and purchased and added at a later time if desired. Furthermore, an older model of a measuring device (e.g., the measuring device 200) that lacks the recessed portion 410 may still use the same calibration control device 250, which allows the economic benefits associated with fewer models and less inventory requirements for the calibration control device 250, and/or the measuring devices 200 and/or 200'.

Figure 5:
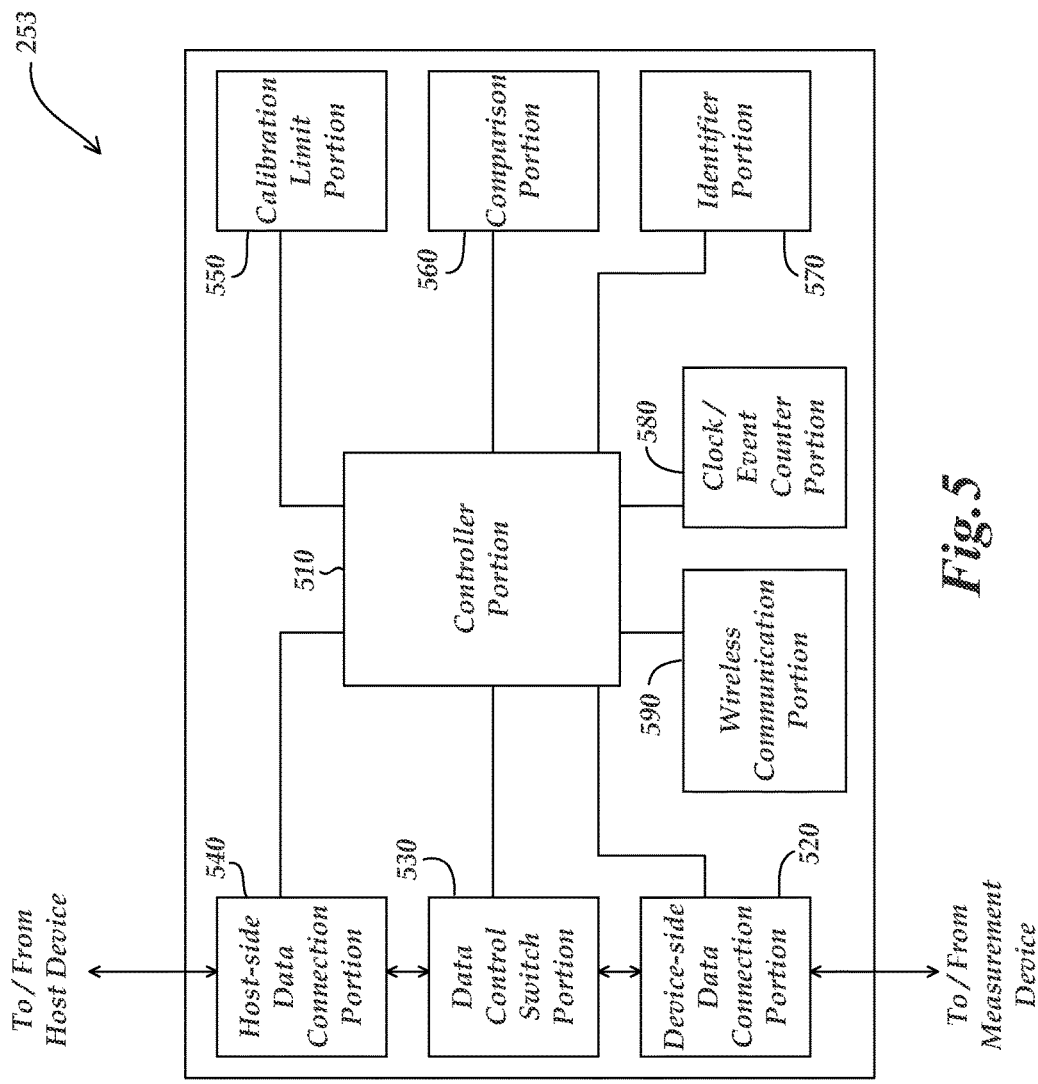
FIG. 5 is a block diagram illustrating an exemplary embodiment of a circuit portion of a calibration control device.

FIG. 5 is a block diagram illustrating an exemplary embodiment of a circuit portion 253 of the calibration control device 250. As shown in FIG. 5, the circuit portion 253 includes a controller portion 510, a device-side data connection portion 520, a data control switch portion 530, a host-side data connection portion 540, a calibration limit portion 550, a comparison portion 560, an identifier portion 570, a clock/event counter portion 580 and a wireless communication portion 590. The device-side data connection portion 520 couples to the measuring device 200 for receiving measuring data. The host-side data connection portion 540 couples to a host device (e.g., host device 190 of FIG. 1) and outputs measuring data to the host device. The calibration limit portion 550 indicates a parameter limit as related to a limited period for which the measuring device has been certified as being calibrated. The parameter limit is defined in terms of a parameter that is related to at least one of time or usage of the measuring device. The comparison portion 560 compares the current state of the parameter to the parameter limit. The controller portion 510 provides control signals, at least one of the control signals being a calibration limit control signal that controls a calibration limit function that is performed when the comparison portion 560 indicates that the parameter has exceeded the parameter limit.

The data control switch portion 530 is connected to receive measuring data from the device-side data connection portion 520 and to output measuring data to the host-side data connection portion 540 when the data control switch portion 530 is in transmitting state. In one implementation, the calibration limit function that is performed when the parameter has exceeded the parameter limit (which may indicate that the calibration for the measuring device 200 has expired) includes altering the state of the data control switch portion 530. For example, the calibration limit function may include placing the data control switch portion 530 in a one of a blocking state or a warning state as controlled by the calibration limit control signal. The warning state may include providing an out-of-calibration warning signal with any measuring data that is transmitted. Such an out-of-calibration warning signal may also be provided by the controller portion 510 or other components of the circuit portion 253 independently of the data control switch portion 530.

The circuit portion 253 may also include a clock/event counter portion 580 that indicates the current state of the parameter to the comparison portion 560. For example, if the parameter limit indicates a time at which the certification of the calibration expires, the clock/event counter portion 580 may indicate the current time to the comparison portion 560 so that a determination can be made if the calibration has expired. Alternatively, in one implementation the clock/event counter portion 580 may keep track of how many events have occurred as related to the parameter. For example, the measuring device may be designed to operate in a low power state where it checks for measurement activity at predetermined periods (e.g., once per second), in which case the clock/event counter portion 580 may receive the event signal from the measuring device and keep a count in order to determine how much time has elapsed.

The identifier portion 570 electronically identifies at least one of the calibration control device 250 and the attached measuring device 200, and may be utilized to transmit the identification to a host system, and/or to a user through the display, or a wireless data connection, and/or to ensure that the calibration control device 250 is not removed from the measuring device 200 or otherwise attached to another measuring device. In one implementation, a trigger circuit or function may be included that operates in conjunction with the identifier portion 570 to alter operations of the calibration control device 250 if the calibration control device is removed from the measuring device 200. For example, the trigger circuit or function may be configured to receive an identification signal from the measuring device 200 and to conform the identification indicated by the identifier portion 570 to the identification that is indicated by the identification signal from the measuring device 200. If the identification that is indicated by the identification signal from the measuring device 200 does not match the identification indicated by the identifier portion 570, then the controller portion 510 may prevent measuring data from being sent to the host device and may provide a signal indicating that the measuring device identification does not match.

The circuit portion 253 may also include a wireless communication portion 590. The wireless communication portion 590 may be configured to receive programming signals for programming the calibration control device 250. For example, the programming signals may be received from a host device or other device when the measuring device is initially certified as being calibrated.

The wireless communication portion 590 may also be configured to wirelessly transmit a device identification as indicated by the identifier portion 570 and an indication of whether the parameter has reached the parameter limit as indicated by the calibration limit portion 550. For example, a system for monitoring multiple measuring devices may rely on such communications for keeping track of the multiple measuring devices and verifying if the calibration certification for any of the measuring devices has expired. The wireless communication portion 590 may also be configured to wirelessly transmit measurement data. For example, the measurement data from the measuring device 250 may be wirelessly transmitted by the wireless communication portion 590 to a host device.

In various implementations, a warning indicator component may be included on the calibration control device 250 and may be utilized to implement at least part of the calibration limit function as controlled by the controller portion 510. In one implementation, the indicator component may provide an indication when the parameter reaches the parameter limit. The indicator component also or alternatively may provide an early warning indication before the parameter reaches the parameter limit. In various implementations, the indicator component may consist of a physical indicator that may be located on the surface of the calibration control device (e.g., an LCD, OLED, etc.).

In one implementation, the host-side data connection portion 540 may include a power connection for receiving power from the host device for powering the calibration control device 250. In an alternative implementation, the device-side data connection portion 520 may include a power connection for receiving power from the measuring device 200 for powering the calibration control device 250. In yet another alternative implementation, the calibration control device 250 may include a battery for powering the calibration control device 250, which may be rechargeable when a connection is made to a power source. An implementation with a battery or a power connection to the measuring device 200 may be desirable when the calibration control device 250 transmits data wirelessly such that there is not a physical connection to the host device for providing power.

As outlined previously, in some implementations, a host connection may not be useful or required (e.g., such that a wired or wireless connection to a host may be omitted), and a calibration control device may be configured to take advantage of communication and/or control possibilities through the device-side connection portion to control or otherwise disable the attached measuring device. In such implementations, the elements 530, 540, 570, and/or 590 may be omitted or inactive.

Those skilled in the art will appreciate that the controller portion 510 of the calibration control device 250 and/or computing systems of the host device or measuring device may generally consist of any computing systems or devices. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 6:
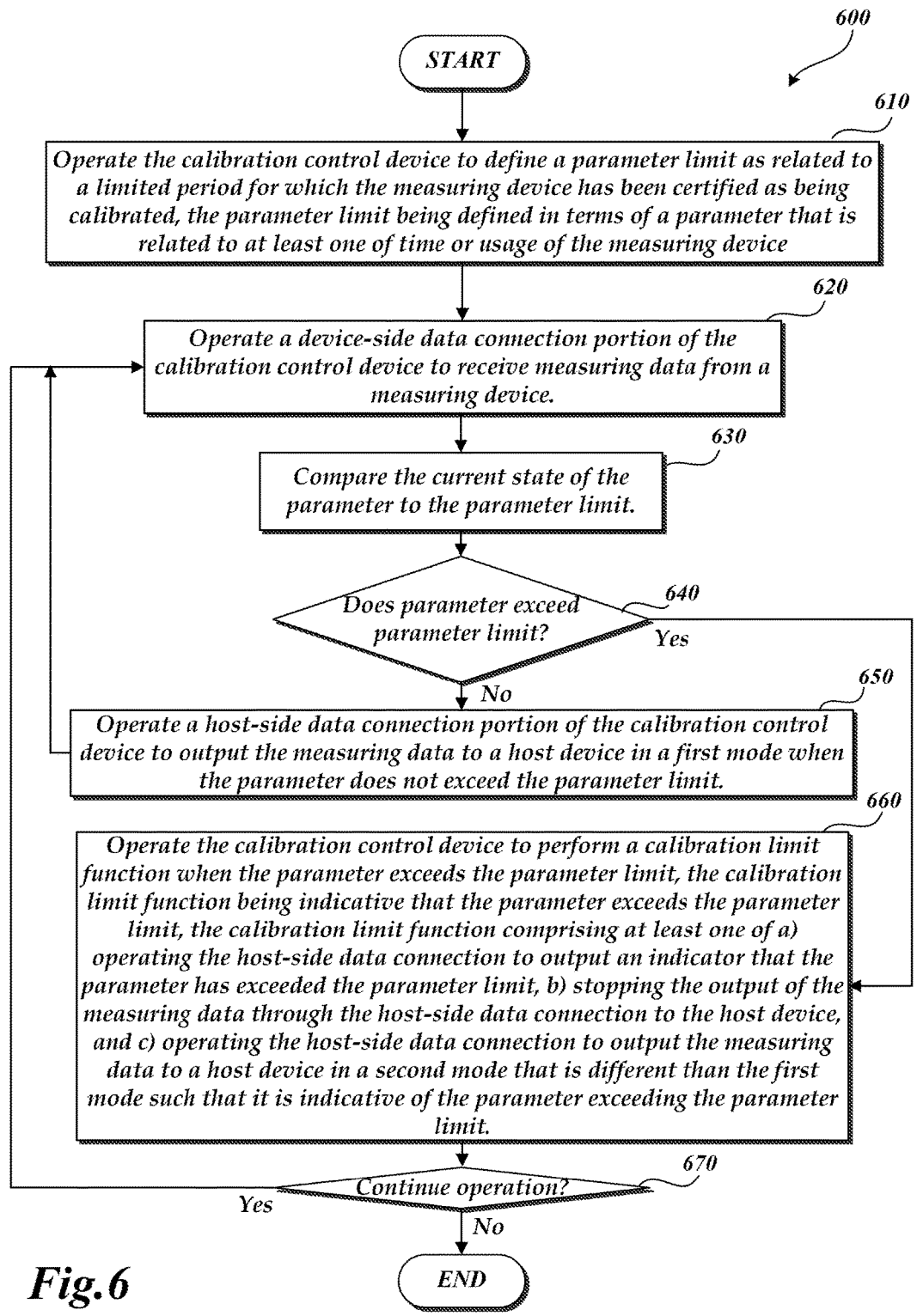
FIG. 6 is a flow diagram illustrating an exemplary embodiment of a routine for operating a calibration control device.

FIG. 6 is a flow diagram illustrating an exemplary embodiment of a routine 600 for operating a calibration control device that is coupled to a measuring device (e.g., as outline above.) In one embodiment, the calibration control device may comprise a body portion coupled to a coupling feature on the measuring device; a memory for storing programmed instructions corresponding to the routine; and a processor configured to execute the programmed instructions to perform the routine. At block 610, the calibration control device is operated to define a parameter limit as related to a limited period for which the measuring device has been certified as being calibrated, the parameter limit being defined in terms of a parameter that is related to at least one of time or usage of the measuring device. At block 620, a device-side data connection portion of the calibration control device is operated to receive measuring data from the measuring device. At block 630, the current state of the parameter is compared to the parameter limit (e.g., using the comparison portion 560 described with reference to FIG. 5.)

At decision block 640, it is determined whether the parameter (that is, the calibration limit parameter) exceeds the parameter limit. Various calibration limit parameters have been described previously. If the parameter does not exceed the parameter limit at decision block 640, then operation proceeds to block 650, where the host-side data connection portion of the calibration control device is operated to output the measuring data to a host device in a first mode (e.g., a normal or "valid calibration certification" mode), and normal operation may then continue by returning to block 620. If the parameter does exceed the parameter limit at decision block 640, then operation proceeds to block 660, where the calibration control device is operated to perform a calibration limit function, the calibration limit function being indicative (e.g., to a host system and/or a user) that the parameter (that is, the calibration limit parameter) exceeds the parameter limit. In various embodiments, the calibration limit function may comprise at least one of (a) operating the host-side data connection to output an indicator that the parameter has exceeded the parameter limit, (b) stopping the output of the measuring data through the host-side data connection to the host device, and (c) operating the host-side data connection to output the measuring data to a host device in a second mode that is different than the first mode such that it is indicative of the parameter exceeding the parameter limit. Various implementations of these features that may be included in a calibration limit function have been outlined previously. The calibration limit function may also include activating a visual indicator that the calibration limit parameter exceeds the parameter limit (e.g., a light or display element included on the calibration control device, and/or a color or element in the measuring device display, or the like.) After the operations of block 660, if at decision block 670 it is determined that operation should continue (e.g., in a warning mode, or the like), then operation may continue by returning to block 620. Otherwise, the routine may end.

While preferred embodiments of the present disclosure have been illustrated and described, numerous variations in the illustrated and described arrangements of features and sequences of operations will be apparent to one skilled in the art based on this disclosure. As a first example, while the present disclosure has been described in terms of embodiments in handheld metrology tools, it may also be implemented in other types of metrology tools according to the claimed features of the present disclosure. As a second example, those skilled in the art will appreciate that the depicted flow chart may be altered in a variety of ways. More specifically, the order of the steps may be re-arranged, steps may be performed in parallel, steps may be omitted, other steps may be included, etc. Thus, it will be appreciated that various changes can be made therein without departing from the spirit and scope of the present disclosure.

The embodiments of the invention in which an exclusive property or privilege is claimed are defined as follows:

1. A calibration control device for being coupled to a measuring device, the calibration control device comprising:
    a body portion configured to couple to a coupling feature on the measuring device;
    a circuit portion comprising:
        an identifier portion for electronically identifying at least one of the calibration control device and the coupled measuring device;
        a device-side data connection portion for coupling to the measuring device for receiving measuring data that is output from the measuring device after the measuring device has performed processing of a measurement signal independent of the calibration control device to provide the measuring data that is received by the device-side data connection portion;
        a host-side data connection portion for coupling to a host device and outputting measuring data;
        a calibration limit portion that defines a parameter limit that indicates when a certification of calibration of the measuring device expires, the parameter limit being defined in terms of a parameter that is related to at least one of time or usage of the measuring device, wherein an exceeding of the parameter limit by the parameter indicates that the certification of calibration of the measuring device has expired; and
        a comparison portion for comparing the current state of the parameter to the parameter limit and indicating when the parameter exceeds the parameter limit; and
        a controller portion for providing control signals to operate the calibration control device, wherein:
            the controller portion operates the calibration control device to output the measuring data that is received from the measuring device to the host device in a first mode through the host-side data connection portion when the parameter does not exceed the parameter limit; and
            the controller portion operates the calibration control device to perform a calibration limit function when the comparison portion of the calibration control device indicates that the parameter exceeds the parameter limit, the calibration limit function being indicative that the certification of calibration of the measuring device has expired.

2. The calibration control device of claim 1, further comprising a communication switch portion connected to receive signals from the device-side data connection portion, and further configured to output measuring data to the host-side data connection portion when the communication switch portion is in a first state corresponding to the parameter not exceeding the parameter limit, and to perform at least a portion of the calibration limit function when the communication switch portion is in a second state corresponding to the parameter exceeding the parameter limit.

3. The calibration control device of claim 2, wherein the second state comprises one of a blocking state or a warning state.

4. The calibration control device of claim 1, wherein the calibration limit function comprises providing an out-of-calibration signal to the host device.

5. The calibration control device of claim 4, wherein the out-of-calibration signal is included with any measuring data that is output to the host device.

6. The calibration control device of claim 1, wherein the body portion comprises an interlocking portion that physically interlocks the calibration control device to the measuring device such that the calibration control device cannot be removed from the measuring device without a specialized interlock release tool.

7. The calibration control device of claim 1, wherein the body portion is shaped to fit within a recessed portion of the measuring device such that the calibration control device does not protrude from the surface of the measuring device.

8. The calibration control device of claim 1, further comprising a battery portion for holding a battery for powering the calibration control device.

9. The calibration control device of claim 1, wherein the host-side data connection portion comprises a power connection for receiving power from the host device for powering the calibration control device.

10. The calibration control device of claim 1, wherein the device-side data connection portion comprises a power connection for receiving power from the measuring device for powering the calibration control device.

11. The calibration control device of claim 1, wherein the parameter is time and the parameter limit comprises at least one of an elapsed time, a time, or a date at which the certification of calibration expires.

12. The calibration control device of claim 1, wherein the circuit portion comprises at least one of a clock portion or an event counter that indicates the current state of the parameter to the comparison portion.

13. The calibration control device of claim 1, wherein at least one of the circuit portion or the host-side data connection portion comprises a wireless communication portion, wherein the wireless communication portion is configured to at least one of: receive programming signals for programming the calibration control device; transmit a device identification as indicated by the identifier portion and an indication of whether the parameter has reached the parameter limit; or transmit measuring data.

14. The calibration control device of claim 1, further comprising an indicator for providing an indication when the parameter reaches the parameter limit.

15. The calibration control device of claim 1, further comprising an indicator for providing an early warning indication before the parameter reaches the parameter limit.

16. The calibration control device of claim 1, further comprising a removal indicating element that comprises at least one of a physical trigger or trigger circuit that is configured to alter operations of the calibration control device if the calibration control device is removed from the measuring device.

17. The calibration control device of claim 16, wherein the removal indicating element is a trigger circuit that is configured to receive an identification signal from the measuring device and if the identification that is indicated by the identification signal does not match the identification indicated by the identifier portion then the controller portion prevents measuring data from being sent to the host device and provides a signal indicating that the measuring device identification does not match.

18. The calibration control device of claim 1, wherein the measuring device is at least one of a caliper, micrometer, or gauge and the coupling feature is at least one of a female connection socket, a mechanical interlock portion, or a mounting connection including a user-installed permanent or semi-permanent fastener on the caliper, micrometer, or gauge.

19. A calibration control device for being coupled to a measuring device, the calibration control device comprising:
a body portion configured to couple to a coupling feature on the measuring device;
a memory for storing programmed instructions; and
a processor configured to execute the programmed instructions to perform operations including:
operating a device-side data connection portion of the calibration control device to receive measuring data that is output from the measuring device after the measuring device has performed processing of a measurement signal independent of the calibration control device to provide the measuring data that is received by the device-side data connection portion;
operating the calibration control device to define a parameter limit that indicates when a certification of calibration of the measuring device expires, the parameter limit being defined in terms of a parameter that is related to at least one of time or usage of the measuring device, wherein an exceeding of the parameter limit by the parameter indicates that the certification of calibration of the measuring device has expired;
comparing the current state of the parameter to the parameter limit and determining based on the comparison if the parameter exceeds the parameter limit;
operating a host-side data connection portion of the calibration control device to output the measuring data that is received from the measuring device to a host device in a first mode when the parameter does not exceed the parameter limit; and
operating the calibration control device to perform a calibration limit function when it is determined based on the comparison of the current state of the parameter to the parameter limit as performed by the processor of the calibration control device that the parameter exceeds the parameter limit, the calibration limit function being indicative that the certification of calibration of the measuring device has expired, the calibration limit function comprising at least one of (a) operating the host-side data connection portion to output an indicator that the certification of calibration of the measuring device has expired, (b) stopping the output of the measuring data through the host-side data connection portion to the host device, or (c) operating the host-side data connection portion to output the measuring data to the host device in a second mode that is different than the first mode such that it is indicative that the certification of calibration of the measuring device has expired.

20. A non-transitory computer-readable storage medium with instructions stored thereon that are executable by a processor in a calibration control device that couples to a coupling feature on a measuring device, wherein the instructions are configured to operate the calibration control device to perform operations comprising:
operating a device-side data connection portion of the calibration control device to receive measuring data that is output from the measuring device after the measuring device has performed processing of a measurement signal independent of the calibration control device to provide the measuring data that is received by the device-side data connection portion;
operating the calibration control device to define a parameter limit that indicates when a certification of calibration of the measuring device expires, the parameter limit being defined in terms of a parameter that is related to at least one of time or usage of the measuring device, wherein an exceeding of the parameter limit by the parameter indicates that the certification of calibration of the measuring device has expired;
comparing the current state of the parameter to the parameter limit and determining based on the comparison if the parameter exceeds the parameter limit;
operating a host-side data connection portion of the calibration control device to output the measuring data that is received from the measuring device to a host device in a first mode when the parameter does not exceed the parameter limit; and
operating the calibration control device to perform a calibration limit function when it is determined based on the comparison of the current state of the parameter to the parameter limit as performed by the calibration control device that the parameter exceeds the parameter limit, the calibration limit function being indicative that the certification of calibration of the measuring device has expired, the calibration limit function comprising at least one of (a) operating the host-side data connection portion to output an indicator that the certification of calibration of the measuring device has expired, (b) stopping the output of the measuring data through the host-side data connection portion to the host device, or (c) operating the host-side data connection portion to output the measuring data to the host device in a second mode that is different than the first mode such that it is indicative that the certification of calibration of the measuring device has expired.

21. A calibration control device for being coupled to a measuring device, the calibration control device comprising:
- a body portion configured to couple to a coupling feature on the measuring device;
- a circuit portion comprising:
  - a device-side data connection portion for coupling to the measuring device for receiving measuring data from the measuring device;
  - a calibration limit portion that defines a parameter limit that indicates when a certification of calibration of the measuring device expires, the parameter limit being defined in terms of a parameter that is related to at least one of time or usage of the measuring device, wherein an exceeding of the parameter limit by the parameter indicates that the certification of calibration of the measuring device has expired; and
  - a comparison portion for comparing the current state of the parameter to the parameter limit and indicating when the parameter exceeds the parameter limit; and
- a controller portion for providing control signals to operate the calibration control device, wherein:
  - the controller portion operates the calibration control device to allow a measuring device display on the measuring device to display the measuring data in a first mode when the parameter does not exceed the parameter limit; and
  - the controller portion operates the calibration control device to alter the measuring device display when the comparison portion of the calibration control device indicates that the parameter exceeds the parameter limit, the display alteration being indicative that the certification of calibration of the measuring device has expired.

22. The calibration control device of claim 21, wherein altering the measuring device display comprises at least one of (a) altering the appearance of the displayed measuring data, (b) stopping display of the measuring data, or (c) activating an indicator element that is indicative that the certification of calibration of the measuring device has expired.

23. The calibration control device of claim 21, wherein the body portion comprises an interlocking portion that physically interlocks the calibration control device to the measuring device such that the calibration control device cannot be removed from the measuring device without a specialized interlock release tool.

24. The calibration control device of claim 1, wherein the measuring device is a handheld caliper, and the calibration control device is configured to be coupled to a slider portion of the caliper that includes a measurement display, and the calibration control device has outer body dimensions along respective directions that are each smaller than corresponding outer body dimensions of the slider portion along a corresponding respective direction, when the calibration control device is oriented for being coupled to the slider portion.

* * * * *